Sept. 6, 1949.  R. T. A. PIFER ET AL  2,481,150
SHOCK-ABSORBING APPARATUS
Filed Sept. 19, 1946                              2 Sheets—Sheet 1
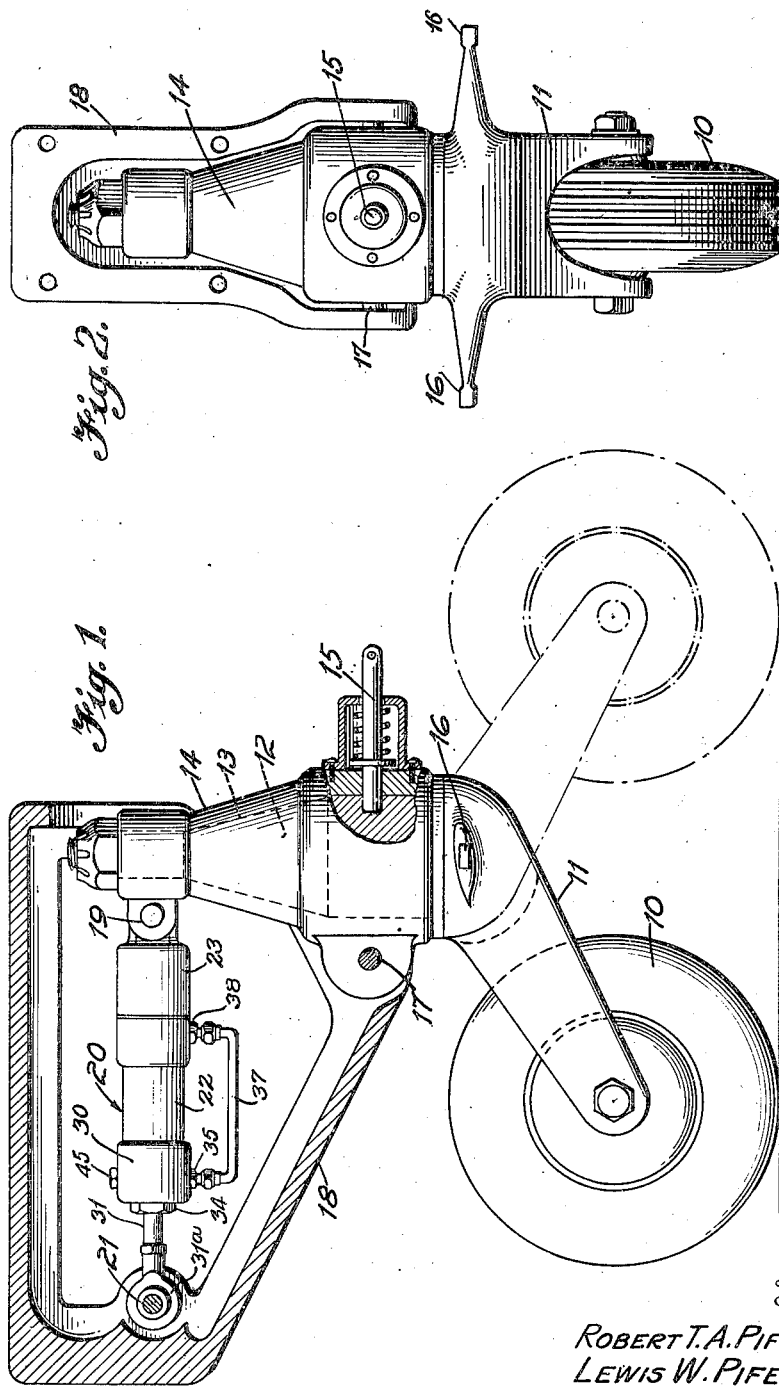
Inventors
ROBERT T. A. PIFER AND
LEWIS W. PIFER
By Stevens, Davis and Miller
Attorneys Sept. 6, 1949.    R. T. A. PIFER ET AL    2,481,150
SHOCK-ABSORBING APPARATUS
Filed Sept. 19, 1946    2 Sheets-Sheet 2
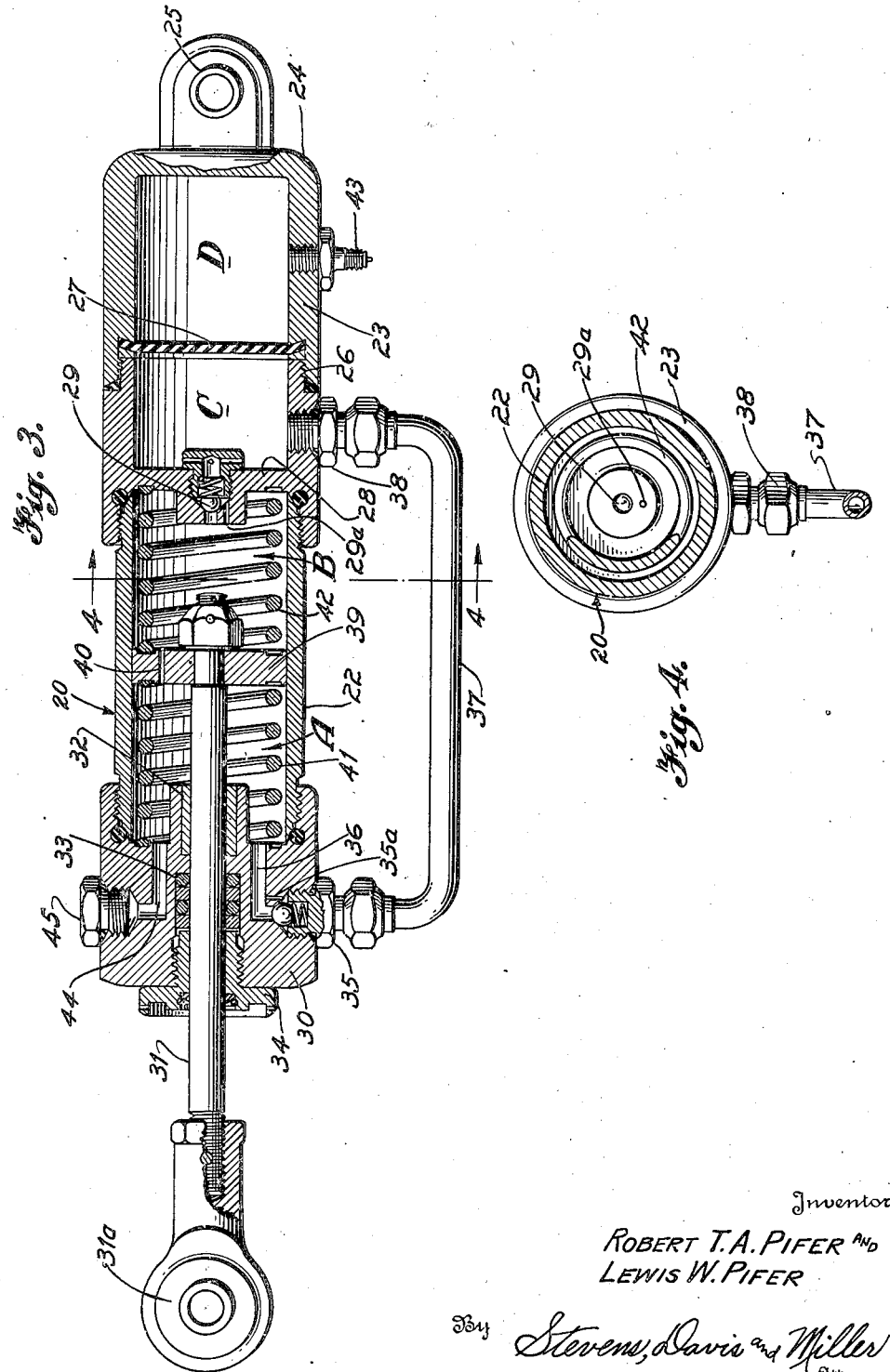
Inventors
ROBERT T.A. PIFER AND
LEWIS W. PIFER
By Stevens, Davis and Miller
Attorneys Patented Sept. 6, 1949

2,481,150

UNITED STATES PATENT OFFICE 2,481,150

SHOCK-ABSORBING APPARATUS

Robert T. A. Pifer and Lewis W. Pifer,
Durham, N. C.

Application September 19, 1946, Serial No. 697,898

5 Claims. (Cl. 244—104)

1

This invention relates to the suspension of aircraft landing elements and is more particularly related to pivotally mounted landing elements of the type in which the static load is resiliently supported.

In the suspension of aircraft landing elements such as wheels, it is common to provide a shock absorber or the like for supporting the landing wheel in a normal position relative to the aircraft fuselage. The landing element in this position, which is the position assumed under static load conditions, is subject to displacement during landing operations and when the landing element strikes an obstruction in the form of a raised or depressed surface. To minimize landing shock and to promote safety in take off and landing operations, it is very important that shock absorbers associated with landing elements be reliable in operation and at the same time restore the landing element to normal position as promptly as possible consistent with passenger comfort.

In an effort to solve the foregoing problems, a large number of shock absorbers have been developed including various means for supporting the static load and various damping means associated therewith to accommodate movements of the landing element away from the static load position. While many of these devices are quite satisfactory in operation, they are so constructed and mounted that large capacity, high cost shock absorbers are required in order to afford an adequate margin of safety, while attempts to employ small capacity, less costly shock absorbers have been thwarted by frequent operational failures.

It is therefore an object of this invention to provide a low cost shock absorber of simple construction that is so mounted with respect to the aircraft landing gear and fuselage as to be able to withstand most adequately any shocks to which it is subjected during landing operations and while taxiing on uneven surfaces.

According to the present invention it is proposed to mount shock absorbers of the landing gear supporting type in a novel way and to provide a novel shock absorber for use with aircraft landing elements and in other wheel suspension installations.

Other objects and advantages of this invention will be apparent upon consideration of the following detailed description of a preferred embodiment thereof in conjunction with the annexed drawings wherein:

Figure 1 is a view in side elevation of a portion of an airplane including a landing wheel mounted in accordance with the teachings of this invention;

Figure 2 is an end view of the landing wheel assembly of Figure 1;

Figure 3 is a longitudinal sectional view of a shock absorber constructed in accordance with the teachings of the present invention and adapted for use in the installation illustrated in Figure 1; and Figure 4 is a view in section taken on the line 4—4 of Figure 3.

Referring now in greater detail to Figures 1 and 2 of the drawings, the reference numeral 10 designates an aircraft nose wheel of conventional design. This wheel is mounted for free rotation between the tines of a fork 11 which is provided with a spindle 12 which is mounted for rotation within a bearing 13 of a housing 14. It will be understood that the details of the mounting of the spindle 12 within the housing 14 constitute no part of the present invention and that conventional arrangements to render the wheel rotatable or self-steering may be incorporated. The wheel as shown, is mounted for castoring movement, but is provided with a lock at 15 to prevent rotation of the spindle 12 in the bearing 13. The lock 15 may be released and the wheel 10 rendered steerable by operation through the lunettes 16.

The housing 14 is pivotally attached at 17 to a generally triangular bracket 18 affixed to or constituting a part of the fuselage of an airplane. The bearing housing 14 at its upper end is pivotally attached at 19 to the cylindrical portion of a shock absorber 20, the piston portion of which is pivotally attached at 21 to the bracket 18. The shock absorber 20 includes a cylinder which is made of two parts, 22 and 23, one end of the part 22 being externally threaded to receive thereover an internally threaded end of the part 23. Cylindrical part 23 is provided with an integral end cap 24 having an eyelet 25 for connection to one of two relatively movable parts. The cylindrical part 23 of the shock absorber is made up of cylinders which are threaded together at 26. At the point of connection of these two parts there is located an elastic diaphragm 27 which is marginally held at the point of connection. Part 23 at its end remote from the integral end cap 24, is provided with a partition 28 having therein a check valve 29 for establishing one-way communication with the interior of the part 22. The body of the check valve 29 is provided with a restricted orifice 29a.

The part 22 of the cylinder 20 is provided with an end cap 30 provided with a central bore for the reception of a piston rod 31. Within the central bore there are located a bearing 32 and packing material 33, the latter being radially expanded by a follower nut 34. The end cap 30 is provided with a check valve 35 which communicates through a channel 36 with the interior of the portion 22 of the cylinder 20. Through the check valve body there is provided a restricted orifice 35a. The other side of the check valve 35 is connected by a tube 37 with a fitting 38 which leads into the portion of the part 23 of the cylinder 20 which lies between the diaphragm 27 and the partition 28.

The piston rod 31 at one end is provided with an eyelet 31a for connection to one of the relatively movable parts between which the shock absorber is disposed. The other end of the piston rod is provided with a piston 39 having therethrough a restricted orifice 40. The piston 39 is positioned within the part 22 of the shock absorber by oppositely disposed coil springs 41 and 42. Coil spring 41 urges the piston to the right, as viewed in Figure 3, and is located between the end cap 30 and the piston 39. The spring 42 urges the piston 39 to the left, as is viewed in Figure 3, and this spring is located between the piston 39 and the partition 28.

It can now be seen that the shock absorber as a whole is divided into four compartments — A, B, C and D. The compartment D is filled with air under pressure through an air valve 43. The chambers A, B and C are filled with oil through a channel 44 in end cap 30. A filling plug 45 is provided for use during filling and draining operations.

In operation, if the shock absorber is caused to contract, that is if the piston rod is moved to the right, as viewed in Figure 3, spring 42 is compressed and valve 29 is opened. Oil is displaced from chamber B into chamber C through check valve 29. The oil cannot escape rapidly from chamber C however, due to the fact that check valve 35 is urged to closed position by a high pressure in the connecting tube 37 and orifice 35a permits only gradual flow. Accordingly, the liquid distends the diaphragm 27 and causes compression of the air in chamber D. The air pressure in chamber D and the balance between the springs 41 and 42 are such as to normally support the static load to which the shock absorber is subjected. Thus, as soon as the shock has passed, the piston rod and the piston 39 are returned to normal position by the action of the compressed air in chamber D. This air tends to restore the diaphragm 27 to normal position and to displace the oil from chamber C into chamber B through orifice 29a to permit restoration of the piston 39 to normal position after displacement to the right, as viewed in Figure 3. Displacement of the piston 39 to the left, as viewed in Figure 3, results in the opening of valve 35 and the discharge of oil from chamber A through tube 37 into chamber C. The displacement of oil again distends the diaphragm 27 and energy is stored in the gas of chamber D. On the return stroke the air pressure in chamber D restores the diaphragm to normal position and the oil is pumped through the tube 37 and through orifice 35a, similar to orifice 29a, but associated with the valve 35. A damping effect is achieved by liquid flow between chambers A and B which takes place through port 40 in the piston 39 and between the periphery of the piston and the cylinder wall.

It will be noted that the distance between the pivot 17 and the landing surface tangentially contacted by the wheel 10 is considerably in excess of the distance between pivot points 17 and 19. For this reason the stroke of the piston 39 in response to shock is relatively short compared to the magnitude of the wheel displacement. Accordingly, the shock absorber is better able to assume and to damp any wheel displacements which occur without danger of failure in operation.

The foregoing description has been devoted entirely to the mounting of the nose wheel of an aircraft. It is to be understood, however, that the same mounting may be applied to tail wheels or to other main and auxiliary wheels of aircraft or other wheeled vehicles. Similarly, the invention is adaptable to skids and landing elements of a nonrotatable type.

It is also to be understood that the foregoing description is exemplary in nature and intended to illustrate the principles of the invention by reference to a particular structure, and that numerous modifications exist within the scope of the invention.

The term "opposite" as used in the appended claims has reference to opposite lever arms rather than opposite in the sense of diametrical difference in position.

What is claimed is:

1. A shock absorber for use between relatively movable parts comprising a cylinder adapted for connection to one of said parts, a piston adapted for connection to the other of said parts, a flexible diaphragm dividing said cylinder into a compressible fluid chamber and a noncompressible fluid chamber, a partition subdividing said noncompressible fluid chamber into a piston working space and a space adjacent said diaphragm, resilient means for maintaining said piston in a normal position, means responsive to displacement of said piston from normal position for establishing communication between the high pressure side of said piston working space and said space adjacent said diaphragm and means establishing restricted communication between said piston working space and the space adjacent said diaphragm whereby the return stroke of said piston is damped.

2. A shock absorber for use between relatively movable parts comprising a cylinder adapted for connection to one of said parts, a piston adapted for connection to the other of said parts, a flexible diaphragm dividing said cylinder into a compressible fluid chamber and a noncompressible fluid chamber, a partition subdividing said noncompressible fluid chamber into a piston working space and another space adjacent said diaphragm, resilient means for maintaining said piston in a normal position subdividing said piston working space into two zones, means establishing restricted communication between each of said zones and said other space, and check valve means for establishing uni-directional flow from either of said zones to said other space.

3. A shock absorber for use between relatively movable parts comprising a cylinder adapted for connection to one of said parts, a piston adapted for connection to the other of said parts, a flexible diaphragm dividing said cylinder into a compressible fluid chamber and a noncompressible fluid chamber, a partition subdividing said noncompressible fluid chamber into a piston working space and another space adjacent said diaphragm, resilient means for maintaining said piston in a normal position subdividing said piston working space into two zones, means establishing restricted communication between each of said zones and said other space, and check valve means for establishing uni-directional flow from either of said zones to said other space, said piston having an orifice therethrough establishing restricted communication between said zones.

4. A shock absorber for use between relatively movable parts comprising a cylinder adapted for connection to one of said parts, a piston adapted for connection to the other of said parts, a flexible diaphragm dividing said cylinder into a compressible fluid chamber and a noncompressible fluid chamber, a partition subdividing said noncompressible fluid chamber into a piston working space and another space adjacent said diaphragm, spring means for normally maintaining said piston in a central position dividing said piston working space into two equal volume zones, means establishing restricted communication between each of said zones and said other space, check valve means for establishing uni-directional communication between each of said zones and said other space.

5. In aircraft including bracket means fixed relative to the fuselage, a landing assembly of bell crank form including a long arm and a short arm, a landing surface contacting element at the end of the long arm, means pivotally connecting said assembly to said bracket at the elbow of the former, a shock absorber including relatively movable parts, means pivotally connecting one of said parts to said bracket means and the other to the short arm of said assembly, one of the movable parts of said shock absorber being a piston and the other being a cylinder, a flexible diaphragm dividing said cylinder into a compressible fluid chamber and a noncompressible fluid chamber, a partition subdividing said noncompressible fluid chamber into a piston working space and a space adjacent said diaphragm, resilient means for maintaining said piston in a normal position, means responsive to displacement of said piston from normal position for establishing communication between the high pressure side of said piston working space and said space adjacent said diaphragm and means establishing restricted communication between said piston working space and the space adjacent said diaphragm whereby the return stroke of said piston is damped.

ROBERT T. A. PIFER.
LEWIS W. PIFER.

REFERENCES CITED

The following references are of record in the file of this patent:

UNITED STATES PATENTS

| Number | Name | Date |
|---|---|---|
| 1,112,705 | Kinkaid | Oct. 6, 1914 |
| 2,174,315 | Dowty | Sept. 26, 1939 |
| 2,357,278 | O'Connor | Aug. 29, 1944 |
| 2,410,176 | Magrum | Oct. 29, 1946 |

FOREIGN PATENTS

| Number | Country | Date |
|---|---|---|
| 166,962 | Great Britain | July 25, 1921 |
| 168,692 | Great Britain | Sept. 14, 1921 |
| 556,148 | Great Britain | Sept. 22, 1943 |